UNITED STATES PATENT OFFICE.

ERLAND THAULOW, OF FREDERIKSBERG, NEAR COPENHAGEN, DENMARK.

COMPOUND FOR WELDING ALUMINIUM AND ALUMINIUM-CONTAINING ALLOYS.

1,139,923.  Specification of Letters Patent.  Patented May 18, 1915.

No Drawing.  Application filed March 4, 1914.  Serial No. 822,499.

*To all whom it may concern:*

Be it known that I, ERLAND THAULOW, a subject of the King of Denmark, residing at Frederiksberg, near Copenhagen, Denmark, have invented a new and useful Compound for Welding Aluminium and Aluminium-Containing Alloys, of which the following is a full, clear, and exact description.

In the soldering or welding of aluminum or aluminum-containing alloys, the main difficulty consists in removing the oxids of aluminum, which is difficult to render soluble, and which covers the surfaces of the molten metal, preventing or making difficult the fusion of the same. To remedy this, numerous methods have been proposed, but all of them have certain drawbacks. Of the compounds to be used, which are generally mixtures of easily fusible salts, certain requirements are necessary, *e. g.*, a suitable melting-point, a certain fusibility, etc. Through tests it has been proved that a mixture of the bisulfates or pyrosulfates of the alkali metals, these being known as capable of rendering soluble oxid of aluminum, with other salts, is especially adapted for the purpose. The difficulty in using such bisulfates is that their melting-points are too high, and also that in an undiluted state they attack the aluminum metal too strongly. As a diluting means, I use salts which have proved to be especially suitable for the purpose, containing as they do acids, which, owing to their non-volatility, are not expelled by the half-bound sulfuric acid in the bisulfates at the relatively high temperature. As such diluting means, borax, generally used as a flux in soldering, is excellently appropriate, having as it does a suitable melting-point, and exercising *per se* a solvent action on metal oxids.

Through tests it has been proved that a mixture of borax and a few per cent. of sodium bisulfate is excellently adapted for the purpose, the oxids formed being instantaneously dissolved, so that the molten metal surfaces flow together easily and homogeneously, the salt-mixture melting prior to the pure aluminum and flowing over the same. The molten salt layer further forms an effective protecting means against oxidation of the aluminum in the air, and this protection is also effective during the melting of the metal. The temperature at which the salt-mixture is volatilized is considerably higher. The salt crust adhering to the place welded, after the cooling, can easily be dissolved and removed by means of water.

I claim:—

1. A welding compound for aluminum and aluminum-containing alloys, including a borate and a bisulfate of an alkali metal.

2. A flux for welding aluminum, consisting of a mixture of borax and bisulfate of an alkali metal, the mixture having a lower melting-point than that of aluminum.

In witness whereof, I have subscribed my signature, in the presence of two witnesses.

ERLAND THAULOW.

Witnesses:
 VIGGO BLOM,
 CECIL V. SCHON.